Patented Apr. 15, 1941

2,238,474

UNITED STATES PATENT OFFICE 2,238,474

PROCESS FOR MAKING OLEFIN OXIDES

Raymond W. McNamee, South Charleston, and Charles M. Blair, Charleston, W. Va., assignors to Carbide and Carbon Chemicals Corporation, a corporation of New York No Drawing. Application July 12, 1938, Serial No. 218,722

11 Claims. (Cl. 260—348)

This invention provides improvements in the process of making olefin oxides by the direct catalytic oxidation of olefins by means of molecular oxygen. Specifically, it provides surface catalysts of increased activity, ruggedness and life for use in such processes.

The process of oxidizing olefins directly to olefin oxides by means of molecular oxygen in the presence of surface catalysts has been described in Reissue Patent 20,370 to T. E. Lefort, dated May 18, 1937. In that patent the use of such surface catalysts as those formed essentially of silver is disclosed. Silver alone, or activated by the addition of small amounts of gold or copper or iron, is a very desirable catalyst for the oxidation of olefins directly to form olefin oxides. However, we have now discovered that silver surface catalysts can be made more rugged and durable, more active, and of greater useful life in the process by incorporating in them limited amounts of certain alkalies. Not all alkaline substances are suitable, and extensive tests have shown that the truly useful promoting agents are the peroxides, oxides and hydroxides of barium, strontium and, to a lesser extent, of lithium. Compounds of alkali metals which form stronger bases than lithium hydroxide or of alkaline earth or earth metals whose hydroxides are weaker bases than strontium hydroxide have either less beneficial effect or are actually harmful to the silver surface catalysts used in the Lefort process. Barium oxide, peroxide and hydroxide are by far the most desirable promoting agents, followed, in order of preference, by the peroxides, oxides and hydroxides of strontium and lithium. Of the stronger bases, sodium hydroxide has less permanent beneficial effect as a promoter, and potassium and caesium hydroxides are actually detrimental in their action. Weaker bases, such as calcium and magnesium hydroxides (or oxides), appear to act as promoting materials for the silver catalysts, but the augmented activity is accompanied by a sharp decrease in the chemical efficiency of the process, and such activation as is secured is therefore undesirable.

The entirely novel reaction by which olefins, especially ethylene, are caused to combine directly with molecular oxygen to form the corresponding olefin oxide (ethylene oxide) has been shown by Lefort to proceed at temperatures of about 150° to about 400° C. Also as shown by Lefort, the reaction proceeds at either atmospheric pressure or at increased or decreased pressures, and any proportion of the olefin and oxygen or air (or other oxygen-containing gas) can be used. The surface catalyst used in carrying out the reaction can be disposed in the reaction vessel in any desired way which will insure the necessary contact of the reactants with the catalyst, and we prefer to employ granular supporting materials, pellets, small rods, or some similar expedient providing an extended surface for this purpose. Artificial silica filter stone, sandstone or one of the commercially available ceramically bonded alumina refractory materials, when crushed and screened to a convenient size, are examples of suitable catalyst supports.

The essential constituent of the surface catalyst is silver, and with it we incorporate a lesser amount of the promoting material. For example, we may use the promoting substances in amounts of from about 2% to about 40% by weight of the silver contained in the catalyst, and, in most cases, about 10% is desirable. The quantity of silver contained in the catalysts supported on inert materials may vary over a wide range, but, in general, we prefer to use from about 5% to about 60% by weight. The size of the catalyst support is not essential, and can be chosen to suit the conditions of operation.

The following specific examples will serve to illustrate the invention:

In each of the tests described in the succeeding examples, the various promoting agents were evaluated by determining the maximum production of ethylene oxide by silver surface catalysts containing the added substances at temperatures of operation within the temperature range of 200° to 300° C. This method of evaluation readily permits the selection of those promoters which are most desirable from practical considerations.

Each test was conducted by passing a mixture of ethylene and air containing 5% of ethylene at the rate of 100 liters per hour over the catalyst contained in a tube having an internal diameter of one inch. The catalysts were supported on irregular particles of porous artificial silica filter stone or similar support sized to between 4 and 8 mesh screens. In each case, approximately 150 cc. of the supported catalyst were used. The catalyst in the tube was maintained at temperatures between 200° and 300° C., and the maximum overall yield of ethylene oxide which was produced within this range was determined by analysis of the issuing gases. In every case, the reactant gases were carefully purified before being admitted to the catalyst chamber.

Example 1

An unpromoted catalyst was prepared by precipitating silver oxide through the reaction of aqueous solutions of silver nitrate and sodium hydroxide in roughly stoichiometrical proportions. The precipitated silver oxide was washed free of alkali and soluble salts and dried.

A mixture of 120 parts by weight of the support crushed and sized as described above, together with 60 parts by weight of silver oxide and 100 parts by weight of water, was heated in an open vessel and stirred vigorously until the water was evaporated.

The maximum yield of ethylene oxide obtained with this catalyst under the conditions set forth was 35%, based on the weight of the ethylene admitted. After 750 hours of operation, the maximum yield obtainable with this catalyst was 22%. When small quantities of ethylene dichloride (equal to about 0.05% by volume of the total gas mixture) were admitted with the purified gases in an effort to improve the chemical efficiency of the reaction obtained with this catalyst, its activity decreased after 8 hours to a maximum yield of only 2%.

Example 2

A catalyst was prepared as described in Example 1 with the exception that to the mixture of silver oxide, water and catalyst support were added 6 parts by weight of barium dioxide.

The maximum yield of ethylene oxide secured with this catalyst under the conditions described was 44%. After 750 hours, its activity was unchanged. A similar catalyst was used continuously in the production of ethylene oxide for more than 7 months, ethylene dichloride in small amounts (less than 0.1% by volume of the total gases) being introduced from time to time to improve the chemical efficiency of the reaction, and it was found to have retained its initial activity.

Other catalysts were prepared in which 20 and 40 parts by weight of silver oxide and 2 and 4 parts by weight of barium dioxide, respectively, were supported on 120 parts by weight of crushed and sized porous silica stone. These catalysts each gave the same initial yield of ethylene oxide as that previously described.

Another catalyst was made up of 20 parts by weight of silver oxide and 2 parts by weight of barium hydroxide supported on 120 parts by weight of crushed and sized porous silica stone. This catalyst possessed a maximum activity, under the same conditions as have been described, equivalent to an overall yield of ethylene oxide of 42%.

Example 3

A catalyst was prepared as in Example 1 in which 60 parts by weight of silver oxide and 6 parts by weight of strontium hydroxide were deposited on 120 parts by weight of the crushed and sized support.

When tested under the conditions described above, this catalyst produced ethylene oxide in amounts equal to a yield of 38%. Its activity was not materially impaired by protracted service, nor decreased significantly by the use of the minute quantities of ethylene dichloride used to improve the chemical efficiency of the reaction.

Example 4

A catalyst identical with that of Example 3 in which lithium hydroxide replaced the strontium hydroxide possessed an activity equivalent to a maximum yield of ethylene oxide of 24%.

Example 5

A catalyst in which potassium hydroxide replaced the strontium or lithium hydroxides of Example 3 or 4 was prepared and tested under the conditions previously described. This catalyst was almost entirely inactive, and the maximum yield of ethylene oxide obtainable with it was only 0.1%.

Caesium hydroxide also appeared to act as a catalyst poison, and catalysts capable of allowing more than traces of ethylene oxide to be formed under the test conditions could not be made using this substance.

Example 6

A catalyst was made as described in Example 1 in which 20 parts by weight of the silver oxide and 2 parts by weight of calcium hydroxide were deposited on 120 parts by weight of the crushed and sized support.

This catalyst initially produced ethylene oxide with an overall yield of 28% under the test conditions. The efficiency was very low, and it was not found possible to secure acceptable yields of ethylene oxide with practicable chemical efficiency under any conditions using this catalyst.

Magnesium and aluminum hydroxides, when substituted for the calcium hydroxide in similar catalysts, suffered the same defects as were exhibited by the calcium-containing catalyst and, additionally, gave maximum initial yields of ethylene oxide which were much lower than were obtained with calcium hydroxide.

In the foregoing description, the greatly improved usefulness of the catalytic materials of this invention has been demonstrated. This is not only due to the higher initial yields which are generally obtained with the promoted catalysts, but also to their longer life. A catalyst formed of silver containing 10% of barium dioxide and supported on a granular ceramically bonded support was found not to have decreased in activity (as determined by the yield of ethylene oxide produced) after seven months continuous operation. A catalyst containing no promoter but formed of the same amount of silver disposed on the same kind of support was found to have decreased 35% in activity after 750 hours operation. Furthermore, the non-promoted catalysts have no practical resistance to poisons, including such selective poisons as ethylene dichloride, which may be used to improve the chemical efficiency of the oxidation reaction. Therefore, the promoted catalysts are not only less susceptible to accidental loss of activity, but they are capable, when used with inhibitors, of producing ethylene oxide with desirably high efficiencies.

The improved catalysts shown herein are not only much less sensitive to poisoning than are the unpromoted catalysts, but they are also more resistant to other deactivating conditions. For example, a catalyst formed of silver oxide together with 10% barium dioxide supported on granular porous silica was intentionally severely overheated so that it lost nearly all of its activity. An unpromoted silver catalyst was similarly treated. On resuming operation at normal conditions, the promoted catalyst regained most of its activity, while the unpromoted catalyst did not.

In the foregoing comparisons between the new catalysts of this invention and unpromoted silver catalysts, the silver in the catalyst compared was as nearly as possible in the same physical condition. The activating or promoting agents of this invention always show an improvement over the same silver used alone, but the extent of improvement achieved varies according to the form of the silver used. Also, in those catalysts high in total silver content the degree of activation produced by this invention is, in general, less than where the silver content is lower. However, in each case the promoted catalyst is definitely preferable because of its increased life, ruggedness, resistance to catalyst poisons and resistance to the effects of sudden general or local overheating.

Variations in the method of obtaining the new catalysts are possible. For example, the peroxides of the metals named are the preferred activating agents, but alternative successful methods of making the promoted catalysts may include the incorporation in the catalyst of the metal hydroxide with or without hydrogen peroxide. Mixtures of two or more of the promoting agents may, of course, be used.

The eventual chemical condition of the promoting metal is not known, but examinations of barium-containing catalysts after use always show the barium to be in a water-soluble, strongly alkaline condition. This is entirely unexpected, since the catalysts in operation are always in contact with carbon dioxide, and the quantitative formation of barium carbonate would appear to be inevitable. A possible explanation seems to be that a hitherto unknown complex containing barium, silver and oxygen is formed, which decomposes when treated with water, giving barium hydroxide and an oxide of silver. Whatever the explanation, this invention is intended to include those catalysts in which the barium, strontium and lithium promoting agents exist in this alkaline condition whether these are added as the oxides, peroxides or hydroxides of the metals or formed in the catalysts as herein described.

Most salts of the metals are definitely without promoting action or are detrimental to the catalysts so long as they exist in the catalyst as such. Some few salts, however, can be converted, during use of the catalyst, into the strongly alkaline condition above described, and are then active as promoters. Thus, barium carbonate is found surprisingly to change into this condition when mixed with silver oxide and used under ordinary operating conditions. Also barium chloride, in the presence of sufficient ethylene oxide and moisture, reacts to give the same result.

The operation of the oxidation process in which the novel catalytic materials of this invention are used may follow that shown in Lefort Re. Patent 20,370. The physical conditions may be varied and selected to suit the exact mode of operation chosen. The ethylene oxide, or other olefin oxide, produced can be recovered in any suitable manner by absorption, condensation or in solution.

The novel catalysts described above may be modified in particulars other than those specifically discussed, and such variations are included within the invention as defined by the appended claims.

This application contains subject matter in common with our copending application Serial No. 157,854, filed August 7, 1937.

We claim:

1. In the process of making olefin oxides by the direct chemical combination of oxygen with olefins at temperatures between about 150° and about 400° C., the use of an active surface catalyst material essentially composed of silver together with a lesser quantity of at least one of the group consisting of the peroxides, oxides and hydroxides of barium, strontium and lithium.

2. In the process of making ethylene oxide by the direct chemical combination of oxygen with ethylene at temperatures between about 150° and about 400° C., the use of an active surface catalyst material essentially composed of silver together with a lesser quantity of at least one of the group consisting of the peroxides, oxides and hydroxides of barium, strontium and lithium.

3. In the process of making ethylene oxide by the direct chemical combination of oxygen with ethylene at temperatures between about 150° and about 400° C., the use of an active surface catalyst material essentially composed of silver together with a lesser quantity of a barium oxide.

4. Process for making olefin oxides by the direct chemical combination of oxygen with the olefin at temperatures between about 150° and about 400° C. which comprises mixing the olefin with molecular oxygen and bringing the mixture into contact with an active surface catalyst essentially comprising silver together with a lesser quantity of at least one of the group consisting of the peroxides, oxides and hydroxides of barium, strontium and lithium while maintaining the temperature of said mixture in contact with said catalyst within the limits stated.

5. Process for making olefin oxides by the direct chemical combination of oxygen with the olefin at temperatures between about 150° and about 400° C. which comprises mixing the olefin with molecular oxygen and bringing the mixture into contact with an active surface catalyst essentially comprising silver together with from about 2% to about 40% by weight of at least one of the group consisting of the peroxides, oxides and hydroxides of barium, strontium and lithium while maintaining the temperature of said mixture in contact with said catalyst within the limits stated.

6. Process for making ethylene oxide by the direct chemical combination of oxygen with ethylene at temperatures between about 150° and about 400° C. which comprises mixing the ethylene with molecular oxygen and bringing the mixture into contact with an active surface catalyst essentially comprising silver together with a lesser quantity of at least one of the group consisting of the peroxides, oxides and hydroxides of barium, strontium and lithium while maintaining the temperature within the limits stated.

7. Process for making ethylene oxide by the direct chemical combination of oxygen with ethylene at temperatures between about 150° and about 400° C. which comprises mixing the ethylene with molecular oxygen and bringing the mixture into contact with an active surface catalyst essentially comprising silver together with from about 2% to about 40% by weight of at least one of the group consisting of the peroxides, oxides and hydroxides of barium, strontium and lithium while maintaining the temperature of said mixture in contact with said catalyst within the limits stated.

8. Process for making ethylene oxide by the direct chemical combination of oxygen with ethylene at temperatures between about 150° and about 400° C. which comprises mixing the ethylene with molecular oxygen and bringing the mixture into contact with an active surface catalyst essentially comprising silver together with from about 2% to about 40% of a barium oxide or hydroxide while maintaining the temperature of said mixture in contact with said catalyst within the limits stated.

9. Process for making ethylene oxide by the direct chemical combination of oxygen with ethylene at temperatures between about 150° and about 400° C. which comprises mixing the ethylene with molecular oxygen and bringing the mixture into contact with an active surface catalyst essentially comprising silver together with about 10% of barium dioxide while maintaining the temperature of said mixture in contact with said catalyst within the limits stated.

10. Process for making ethylene oxide by the direct chemical combination of oxygen with ethylene at temperatures between about 150° and about 400° C. which comprises mixing the ethylene with molecular oxygen and bringing the mixture into contact with an active surface catalyst essentially comprising silver together with from about 2% to about 40% of a strontium oxide or hydroxide while maintaining the temperature of said mixture in contact with said catalyst within the limits stated.

11. Process for making ethylene oxide by the direct chemical combination of oxygen with ethylene at temperatures between about 150° and about 400° C. which comprises mixing the ethylene with molecular oxygen and bringing the mixture into contact with an active surface catalyst essentially comprising silver together with from about 2% to about 40% of a lithium oxide or hydroxide while maintaining the temperature of said mixture in contact with said catalyst within the limits stated.

RAYMOND W. McNAMEE.
CHARLES M. BLAIR.